April 16, 1957

C. E. SLAUGHTER 2,788,834

METHOD AND APPARATUS FOR SEALING
CLOSURES IN TUBULAR CONTAINERS

Filed June 19, 1953

INVENTOR,
CHARLES E. SLAUGHTER

BY Sol Shappirio

ATTORNEY

INVENTOR
CHARLES E. SLAUGHTER

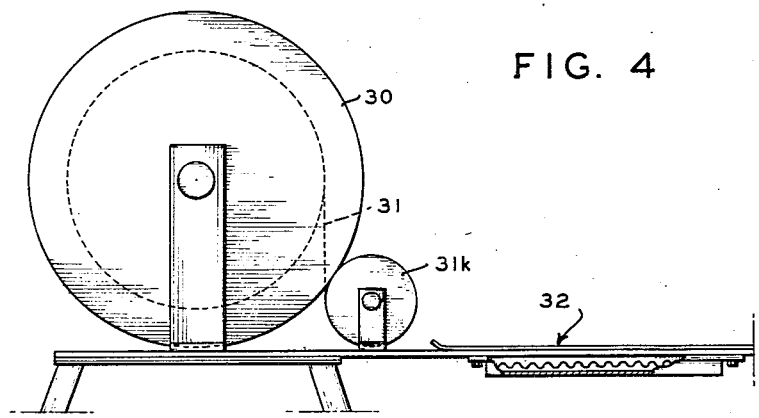
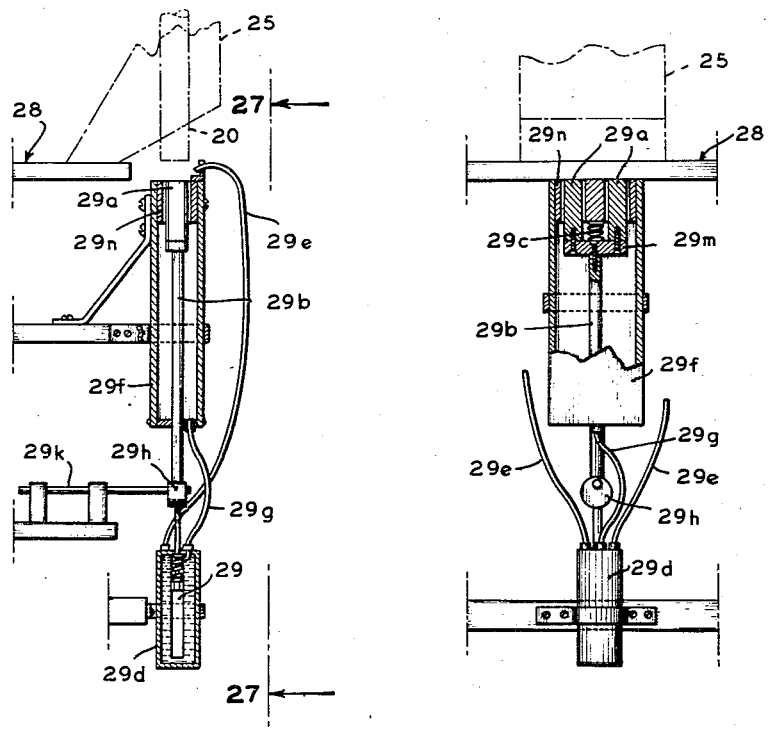
FIG. 4
FIG. 8
FIG. 9

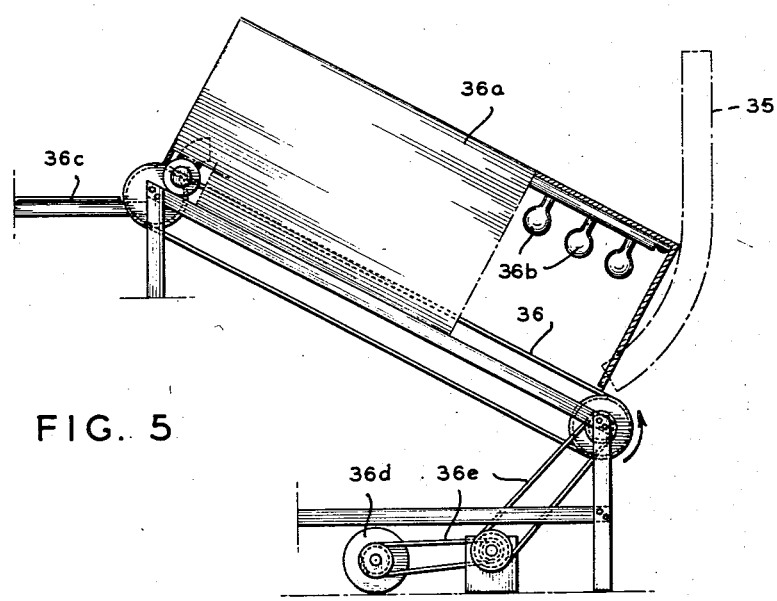
FIG. 5
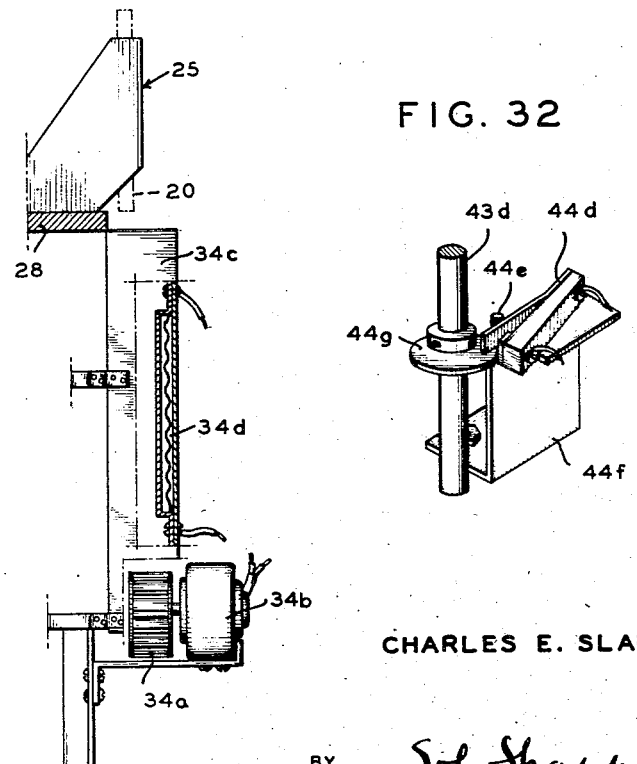
FIG. 7
FIG. 32
INVENTOR
CHARLES E. SLAUGHTER
BY Sol Shapario
ATTORNEY April 16, 1957 C. E. SLAUGHTER 2,788,834
METHOD AND APPARATUS FOR SEALING
CLOSURES IN TUBULAR CONTAINERS
Filed June 19, 1953 13 Sheets-Sheet 6

INVENTOR
CHARLES E. SLAUGHTER

BY Sol Shappirio

ATTORNEY

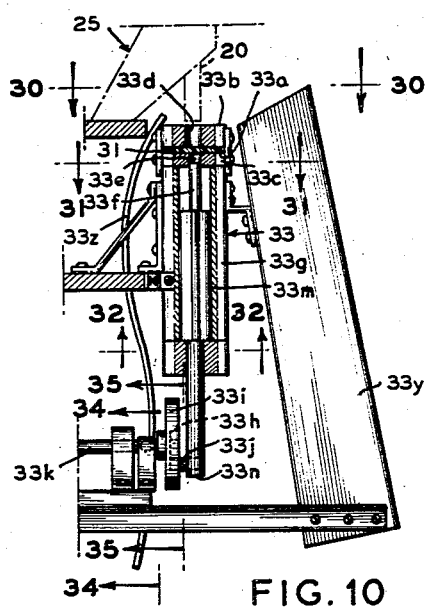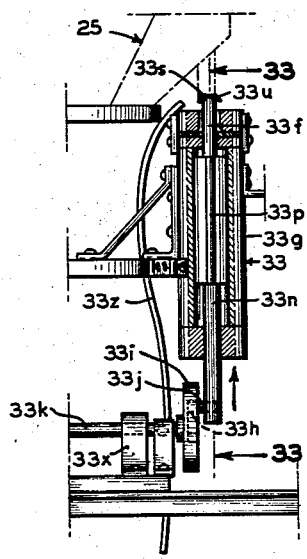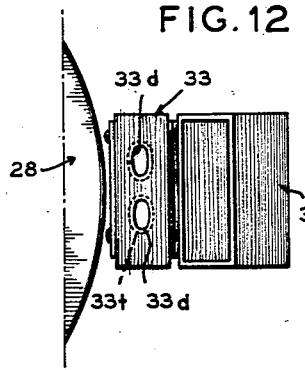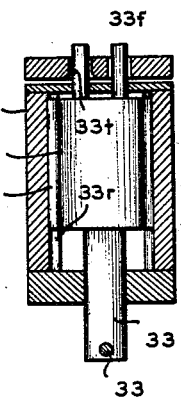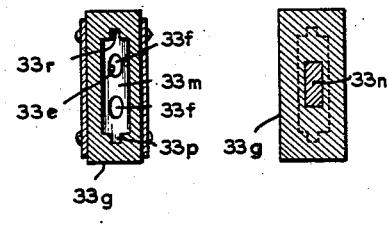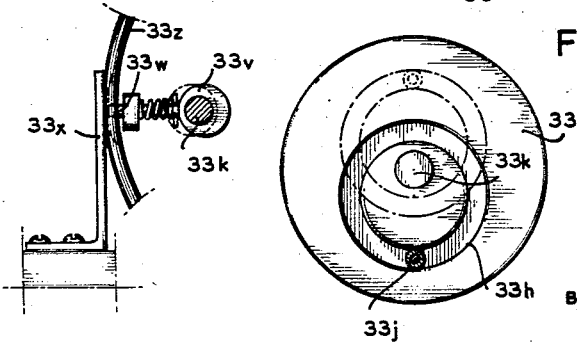
INVENTOR
CHARLES E. SLAUGHTER
BY Sol Shapprio
ATTORNEY April 16, 1957

C. E. SLAUGHTER 2,788,834

METHOD AND APPARATUS FOR SEALING
CLOSURES IN TUBULAR CONTAINERS

Filed June 19, 1953

INVENTOR
CHARLES E. SLAUGHTER

BY *Sol Shappirio*

ATTORNEY

April 16, 1957 C. E. SLAUGHTER 2,788,834
METHOD AND APPARATUS FOR SEALING
CLOSURES IN TUBULAR CONTAINERS
Filed June 19, 1953 13 Sheets-Sheet 9
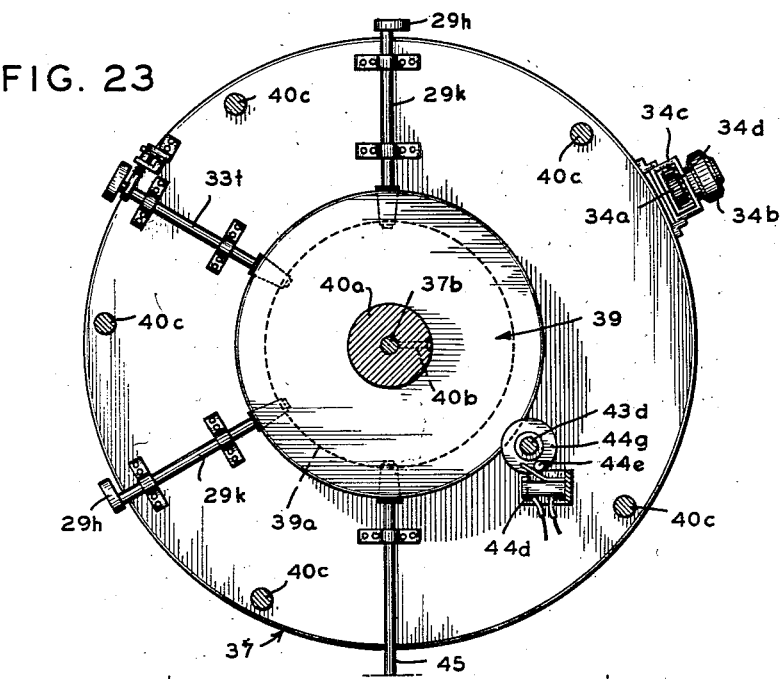
FIG. 23
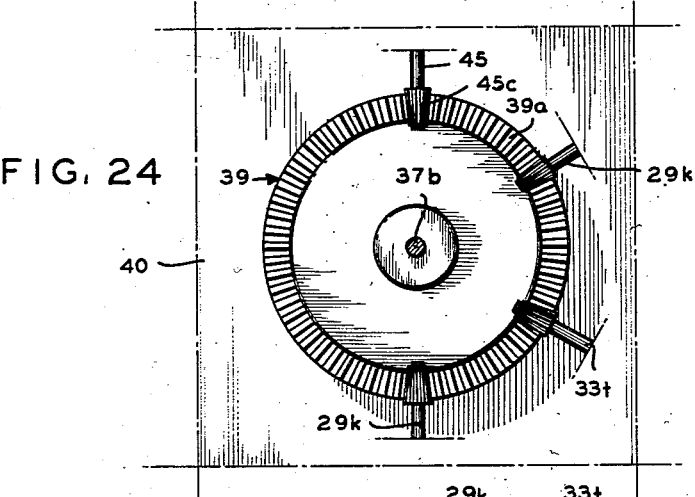
FIG. 24
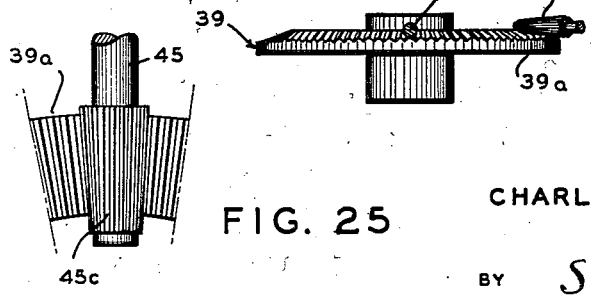
FIG. 25
FIG. 26
INVENTOR
CHARLES E. SLAUGHTER
BY Sol Shappirio
ATTORNEY

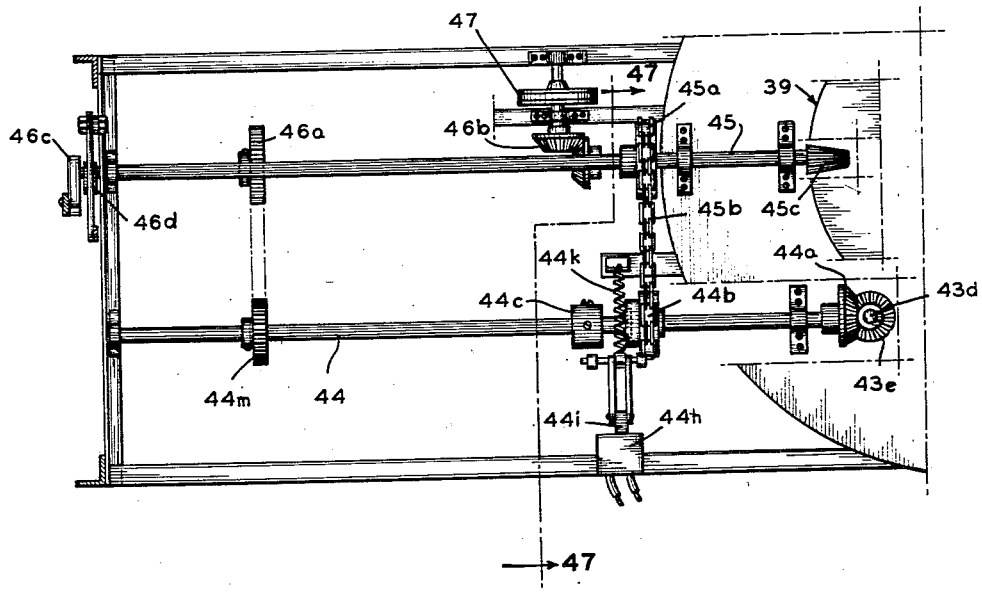

April 16, 1957 C. E. SLAUGHTER 2,788,834
METHOD AND APPARATUS FOR SEALING
CLOSURES IN TUBULAR CONTAINERS
Filed June 19, 1953 13 Sheets-Sheet 11

INVENTOR
CHARLES E. SLAUGHTER

BY Sol Shappirio
ATTORNEY

April 16, 1957

C. E. SLAUGHTER 2,788,834

METHOD AND APPARATUS FOR SEALING
CLOSURES IN TUBULAR CONTAINERS

Filed June 19, 1953

INVENTOR
CHARLES E. SLAUGHTER

BY
ATTORNEY

INVENTOR
CHARLES E. SLAUGHTER
BY Sol Shapiro
ATTORNEY

United States Patent Office 2,788,834
Patented Apr. 16, 1957

2,788,834
METHOD AND APPARATUS FOR SEALING CLOSURES IN TUBULAR CONTAINERS

Charles E. Slaughter, Norwalk, Conn., assignor to Extruded Plastics, Inc., a corporation of Connecticut Application June 19, 1953, Serial No. 362,865

10 Claims. (Cl. 154—1)

This invention relates to methods and machines for making tubular containers and particularly for the production of containers from tubes or tubing specifically plastic tubes or tubing.

This application is a continuation-in-part of application, Serial No. 772,095, filed September 4, 1947, entitled "Methods and Machines for Making Tubular Containers," now Patent No. 2,661,790, and of application, Serial No. 676,493, filed June 13, 1946, entitled "Tubular Container," patented January 29, 1952, Patent No. 2,584,095.

Prior art methods of producing containers from plastic materials have not been able to compete successfully in many fields, despite the evident disadvantages of glass due to its fragile nature, because of several reasons. Among those reasons one has been cost of manufacture resulting from the requirement of manual operations at many stages of the procedure. Another reason has been because those manual operations do not produce finished containers of good workmanship-like character. The closures in such containers do not fit properly, solvents and cements applied for sealing the closures in position mar the surfaces of the plastic and a satisfactory appearing article is not produced as a routine matter of production, there being many rejects.

In the process of sealing a disc of plastic to the end of a comparatively heavy walled plastic tube, as for instance in the manufacture of mechanical pencil barrels, it is the custom to dip the end of the plastic tube into a saucer shaped vessel containing an adequate supply of solvent. In an attempt to overcome evaporation, fire hazard, etc., various absorbent materials such as felt, etc. have been tried out in the solvent bath but these have not proved to be satisfactory and in general practice only the open pool of solvent is used.

When handling thin walled tubing with a thickness of .010" to .025" it has been found to be impossible, on a production basis to use this open pool of solvent since any slight excess on the inner and outer walls of the tube quickly leaches plasticizer from the base resin. When using solvent for sealing a disc into a thin walled tube as outlined in copending application Serial No. 772,095, this problem proved to be very serious since if any excess of solvent was used the end of the tube with seal became brittle due to lack of plasticizer with the result that serious breakage occurred. At the same time if there was not quite sufficient solvent applied then an imperfect weld was formed with the result that the sealed in base dropped out under any slight strain.

In applying a solvent to the base of a thin walled tube made from cellulosic plastic such as for instance cellulose acetate or cellulose acetate butyrate, it is of the utmost importance that just the right quantity of solvent shall be applied—no more and no less. Absolute control of the amount of solvent to be applied under varying degrees of humidity and atmospheric temperature has proved to be most difficult since the solvents used are generally highly volatile, many are hydroscopic and all present a fire hazard.

Among the objects of the present invention is the production of containers from plastics in which continuous operations are carried out resulting in the economical production of containers in great numbers on large scale operations.

Further objects include continuous automatic operations resulting in high rates of production of plastic containers.

Still further objects include positive control of the solvent or liquid cement applied to tubes to seal closures therein to produce strong seals.

Still further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In connection with that more detailed description, there is shown in the accompanying drawings, the following:

Figure 4 is a side elevation partly in section on line 8—8 of Figure 1 showing the means for feeding tape from which caps or closures are punched;

Figure 5 is a side elevation on line 9—9 of Figure 1 showing the conveyor means for removing the finished tubes having sealed closures to storage;

Figure 7 is a detail partly broken away on line 25—25 of Figure 6 showing the blower and heater utilized at station 5 of the sealing mechanism;

Figure 8 is a side elevation partly in section on line 26—26 of Figure 6 showing the means for delivering solvent to the tubes during the sealing operation;

Figure 9 is a detail partly in section on line 27—27 of Figure 8;

Figure 10 is a side elevation partly in section on line 28—28 of Figure 6 showing the punching mechanism for punching out caps or closures and placing them tentatively in the tubes;

Figure 11 is a view similar to Figure 10 showing the position of the punch means after a closure has been punched out and is positioned in the tube;

Figure 12 is a fragmentary detail on line 30—30 of Figure 10;

Figure 13 is a fragmentary detail in section on line 31—31 of Figure 10;

Figure 14 is a fragmentary detail in section on line 32—32 of Figure 10;

Figure 15 is a central section on line 33—33 of Figure 11 through the punch mechanism;

Figure 16 is a fragmentary detail of means for controlling the flow of air in the blower on line 34—34 of Figure 10;

Figure 17 is a detail on line 35—35 of Figure 10;

Figure 18 is a detail of the chuck for holding the tubes when they are carried through the various sealing operations at the several stations in the sealing mechanism;

Figure 21 is a fragmentary detail on line 39—39 of

Figure 19:
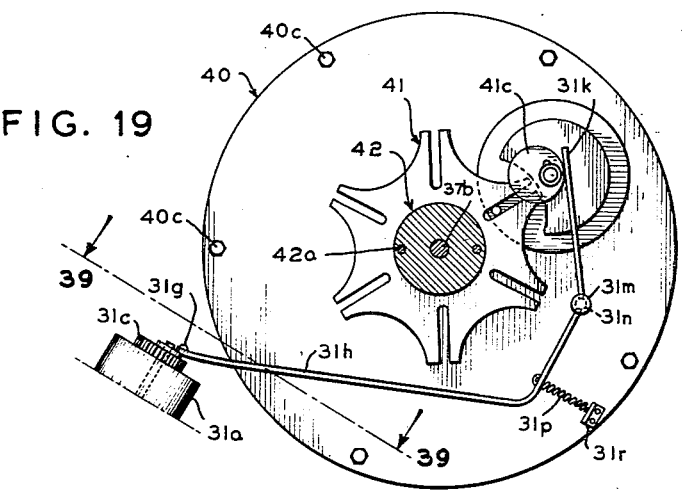
Figure 19 is a fragmentary detail on line 37—37 of Figure 3 showing the means for correlating the feeding of tape to the closure punching mechanism with the movement of the tubes through the several stations in the sealing mechanism.
Figure 22:
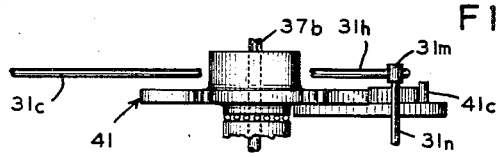

Figure 19 showing the ratchet mechanism for drawing the plastic tape through the punch press for producing closures;

Figure 22 is a detail showing a side elevation of the parts in Figure 19.

Figure 1:
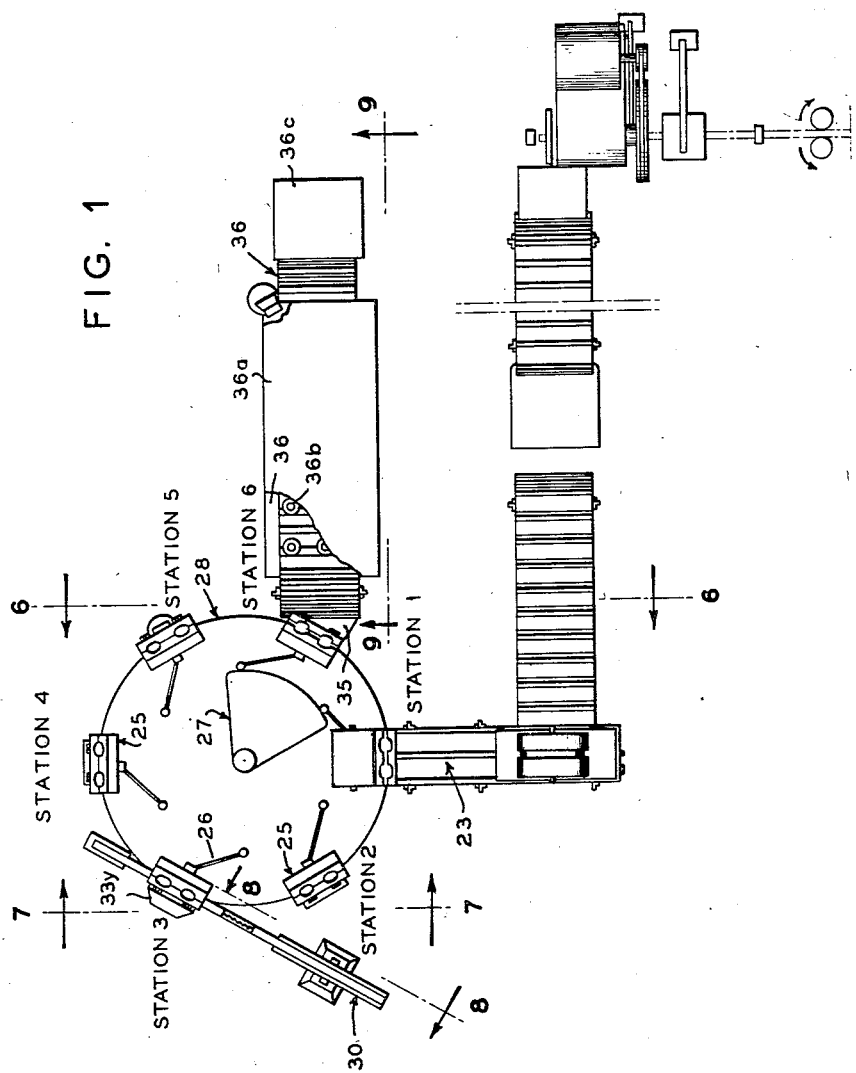
Figure 1 is a top plan diagrammatic view of all of the associated mechanism showing the general layout.
Figure 2:
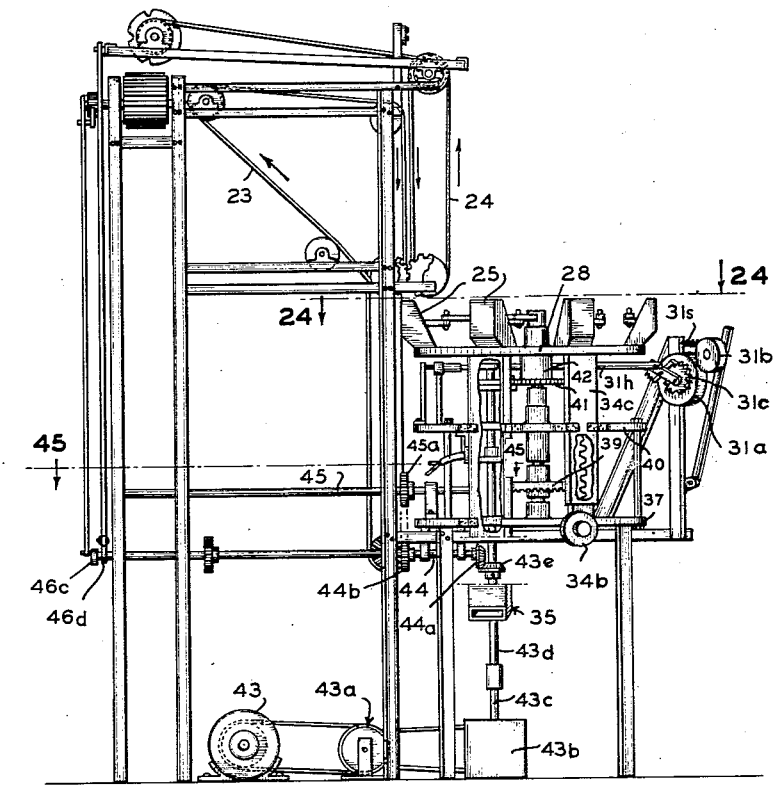
Figure 2 is a side elevation on line 6—6 of Figure 1 showing the sealing machine and related mechanism.
Figure 3:
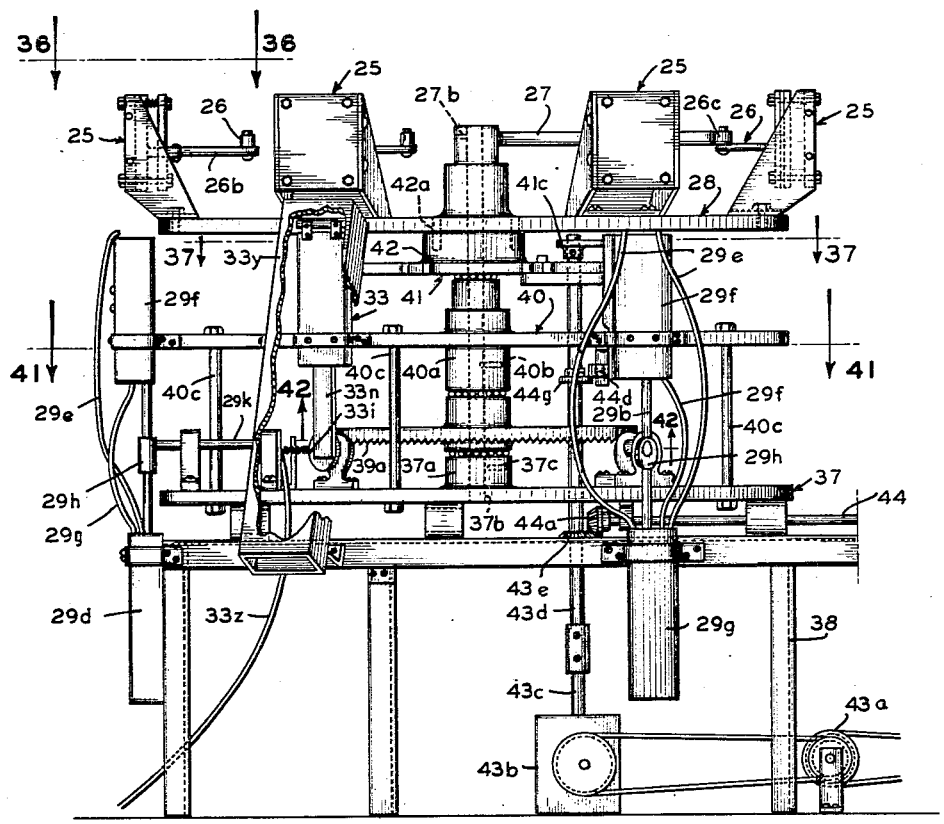
Figure 3 is a side elevation on line 7—7 of Figure 1 showing the sealing and related mechanisms.
Figure 30:
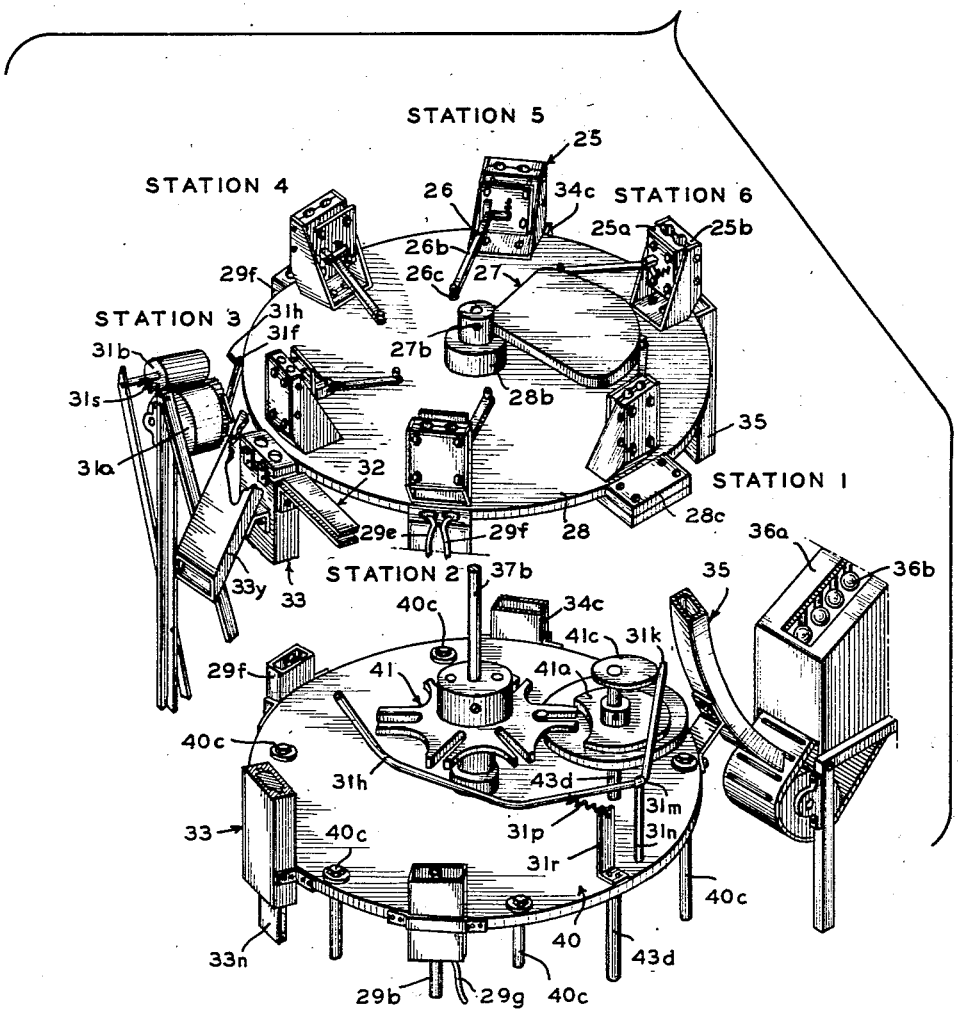
Figure 31:
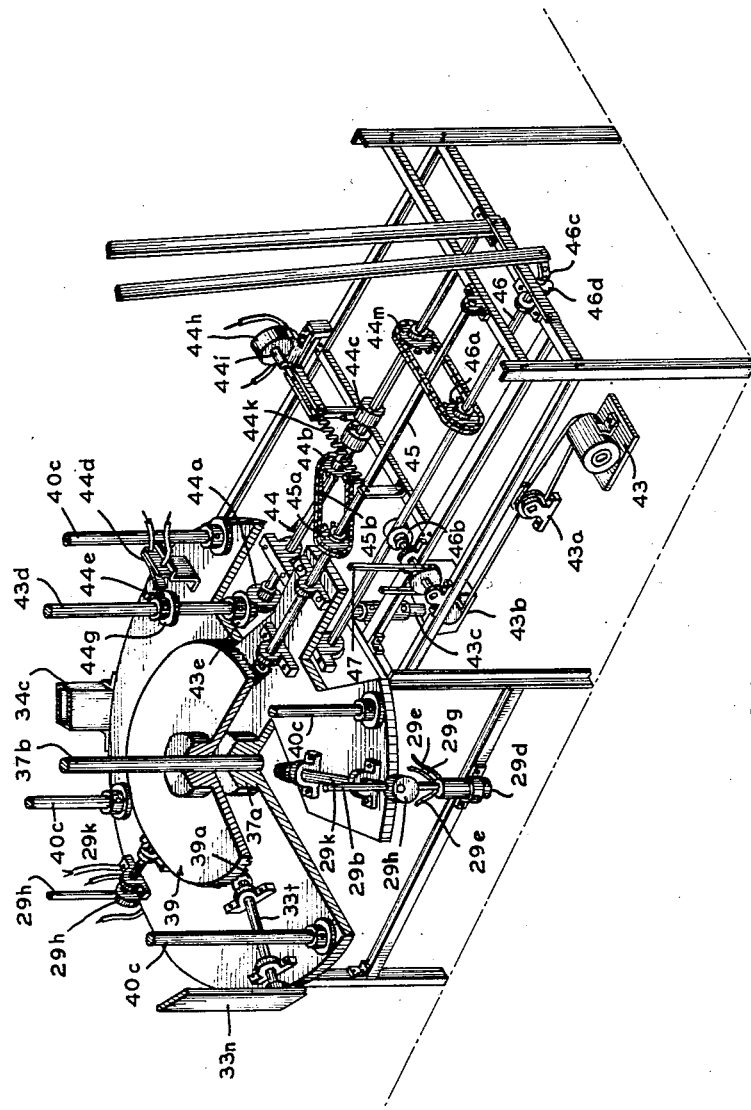
Figure 34:
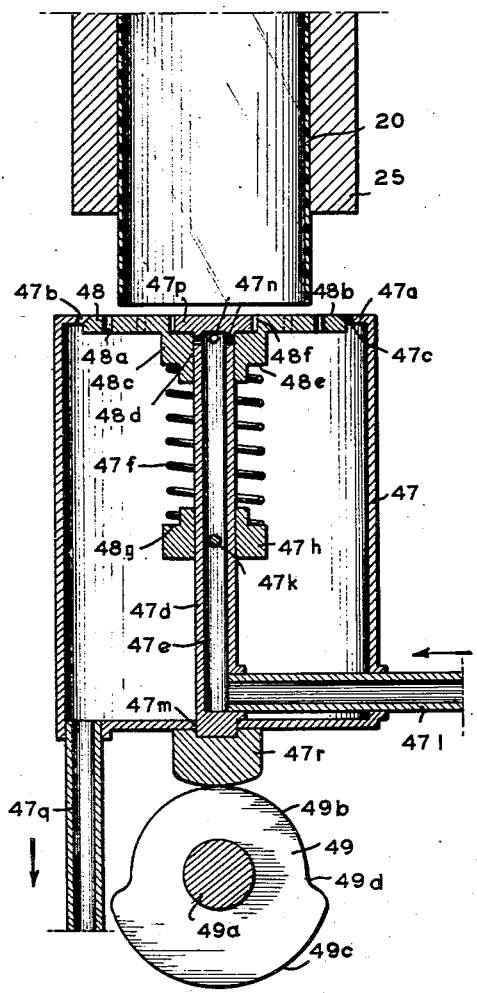
Figure 35:
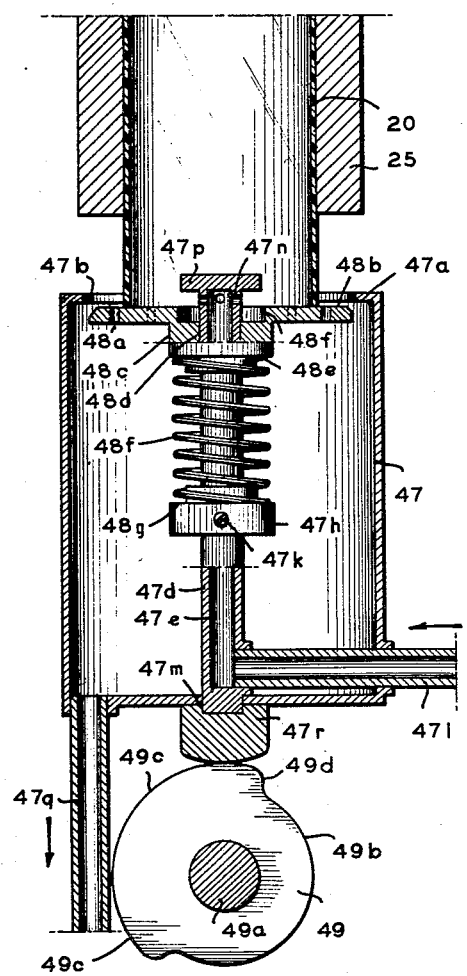
Figure 33:
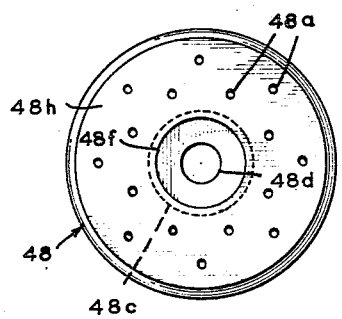

Figure 23 is a detail on line 41—41 of Figure 3 showing the means for transmitting power to the various stations of the sealing mechanism;

Figure 24 is a fragmentary plan view on line 42—42 of Figure 3 also showing details of the method of transmitting power to the stations of the sealing mechanism;

Figure 25 is a fragmentary detail enlarged, of elements of Figure 24;

Figure 26 is a side view of Figure 24;

Figure 27 is a plan view on line 45—45 of Figure 2 showing elements by which power is transmitted to various portions of the mechanism;

Figure 28 is an end view of Figure 29;

Figure 29 is a fragmentary detail on line 47—47 of Figure 27 showing the clutch control in connection with certain power transmitting mechanism;

Figure 30 is an exploded view of portions of the sealing mechanism showing the chucks which carry the tubes through the several stations and the means for transmitting power to such stations as well as for correlating the movement of the sealing mechanism with the tape feeding mechanism for producing the closures;

Figure 31 is a perspective view partly in section showing the general means for supplying power to the sealing mechanism; and in Figure 32 is a fragmentary detail of the switch control for operating the clutch in connection with power transmission to one of the elements;

Figure 33 is a top plan view of a modified form of disc on which a layer of solvent or cement is placed;

Figure 34 is a transverse section through a casing and associated parts for applying solvent or cement to the end of a thermoplastic tube;

Figure 35 is a section similar to Figure 34 showing a different position of the mechanism of Figure 34.

In accordance with the present invention tubular containers are produced from plastic tubing and tubes although the invention is applicable to the production of containers from various other materials including metals, in at least many of the operations set forth below. The invention will be illustrated particularly in connection with the production of containers from plastics and more particularly from thermoplastic materials.

The tubes for the manufacture of the containers may be obtained from any source. Where the tubes for the containers are produced from extruded stock they will in general be made from a thermoplastic material. Any of the thermoplastic materials utilized in producing extruded tubular stock may be employed for these purposes, and particularly synthetic resinous material may be used including for example, cellulose derivatives such as the esters and ethers, particularly cellulose acetate, cellulose nitrate, cellulose acetate butyrate, ethyl cellulose, benzyl cellulose, etc.; vinyl polymers and copolymers including polymerized vinyl acetate, polymerized vinylidene chloride, and copolymers of vinyl chloride and vinyl acetate; polymerized styrene; methacrylate and methyl methacrylate resins; acrylate and ethyl acrylate resins; polyethylenes; nylon type resins; etc. Where the tubes are made from plastic stock which is not extruded, the materials may be of the character set forth above or any of the thermosetting resins used for making tubular stock may be employed. And as pointed out above, for some purposes many of the operations herein set forth may be carried out on tubes made from other than plastics such as metal, paper or cardboard, etc.

The cross-sectional contour of the tubing or tubes employed may be varied as desired and may take any configuration such as circular, oval, square, hexagonal, or otherwise polygonal, etc., and containers may be produced from any stock of any configuration desired. The plastic materials lend themselves to the use of color and colored stock of any desired character may be employed whether dyed, pigmented, striated, etc.

The tubes thus obtained in any desired way as set forth above, are continuously delivered to what may be called the sealing station where the tubes continuously pass through a series of stations at which the operations for introducing the closure and sealing the closure in position are carried out. The tubes may be delivered to the sealing station either as individual tubes operated on successively in such sealing station, or a group of tubes such as two or more tubes may be simultaneously fed side by side to the sealing station and the sealing operation carried on such group of tubes simultaneously. Operations in this way increase the capacity and rate of production of containers.

It is an important feature of the present invention that the closures for the tubular containers are desirably manufactured at the sealing station immediately prior to their use, that is, immediately prior to the insertion of the closures into the tubes to produce the containers. The manufacture of the closures in this way immediately prior to their utilization, particularly carried out by automatic means, greatly increases the capacity of the devices, avoids the necessity for handling individual closures from hoppers, and eliminates many manual operations otherwise required. After insertion of the desired closures into the tubes to produce the containers, application of solvents or cement may be made followed by drying operations resulting in the continuous production of containers at very high rates of production by automatic means eliminating manual operations and resulting in finished articles that are produced in practically perfect condition by routine methods of procedure despite the very high rates of production which are possible in accordance with the present invention.

Many features of the operation including both steps employed and the machinery involved will appear from the description of the detailed apparatus and operations as set forth below describing in detail the mechanism and operations of the device as shown in the drawings.

The mechanism for applying a closure to an end of the tube and sealing it in its position involves a sequential operation in which the tube or pair of tubes are automatically conveyed through a series of successive stations as follows: at the first station the tubes are positioned in an open chuck in which they are locked and then carried to a second station where a thin layer of solvent for the plastic employed in making the tubes is applied to the end of each tube. The chuck carrying the tubes the ends of which have been wet with solvent, is then automatically moved to the next station at which a closure or sealing cap is punched automatically from sheet material and pushed into position in each tube where they are held lightly in position both by the natural "spring" of the plastic due to the special shape of the stamping and also by the action of the very thin layer of solvent cement on the end or rim of the tube; the tubes are then carried to the next succeeding station where the closures or caps are pushed into exact position in line with the end of the tube in which they are being placed at the same time that the solvent, which has been applied to the closures or caps before or after insertion, is drawn by capillary action into the inside of the tube between the rim of the closure of cap and the end of the tube; the closures or caps thus having been placed in position, the tubes are moved to the next station where they are subjected to drying by a blast of hot air blown against the bottom of the tubes to remove surface solvent; and they then move to the final station where the chuck is automatically opened, and the tubes drop therefrom down a chute to a conveyor.

Figure 6:
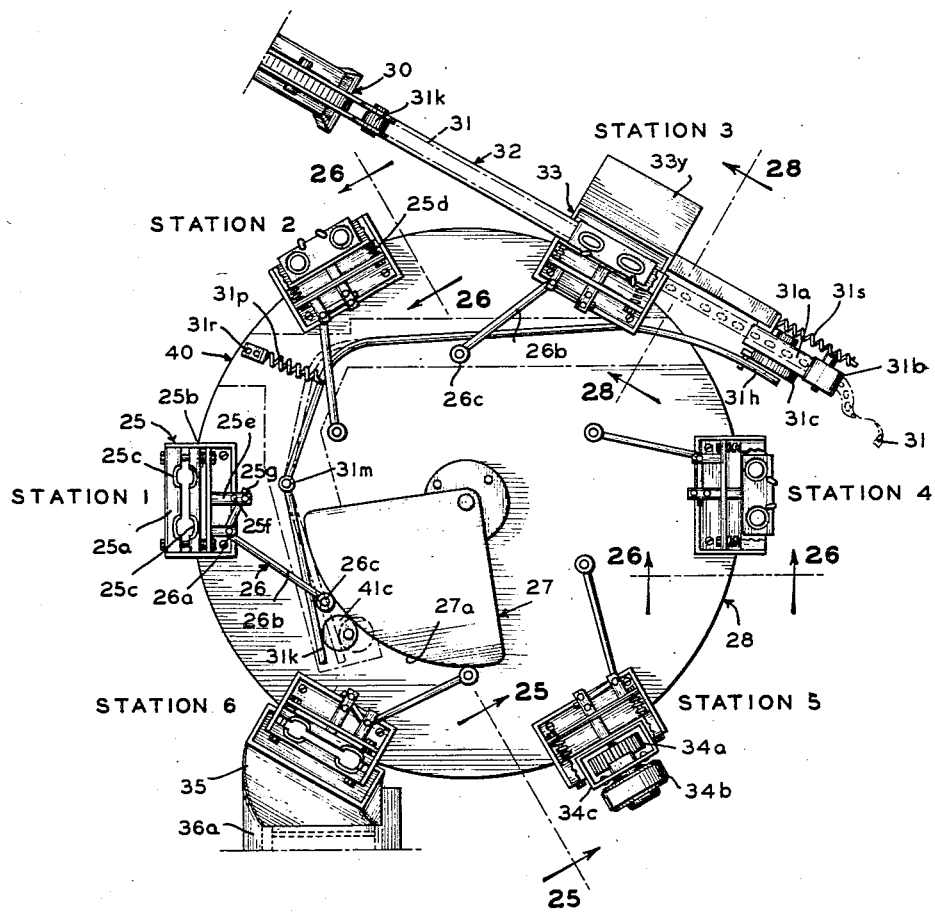
Figure 6 is a plan view on line 24—24 of Figure 2 with parts broken away showing the various stations in the sealing mechanism.

Referring more particularly to the mechanism utilized for carrying out this series of operations, the two tubes 20 delivered by the belts 23 and 24 (Figure 2) are pushed into the chuck 25 which is open at this time and the sheared tubes 20 are inserted into the chuck by the belts, dropping the last inch by gravity. Base plate 28c (Figure 30) fixes the position of the tubes in respect to the bottom of the tube holders. There are a series of six chucks 25 mounted at six equi-distant points at the periphery of the top plate 28 (Figure 6). The chucks are all identical. Each chuck consists of a stationary front plate 25a and a movable back plate 25b, the plates being provided with recesses 25c conforming to the cross-sectional contour of the sheared tubes. Springs 25d normally press the movable back plate 25b toward the stationary front plate 25a to lock desired tubes in position in the recesses. To open the chuck for reception of the tubes, the movable back plate 25b is provided with an arm 25e extending rearwardly thereof and having pins 25f thereon which receive the end 25g of the bell crank 26. The bell crank is pivotally mounted at 26a and has an arm 26b extending rearwardly and angularly from the chuck 25 into contact with a stationary boss plate 27. A roller 26c at the end of the arm 26b of the bell crank 26 engages against the edge of the stationary boss plate 27, the latter being mounted above the top plate 28. As shown in Figure 6, when the roller 26c of the bell crank 26 rides along the arcuate edge 27a of the stationary boss plate 27, the bell crank forces the arm 25e on the movable back plate 25b rearwardly to open the chuck to permit reception of sheared tubes fed by the belts 23 and 24 into the chuck. As soon as the roller 26c on the bell crank 26 clears the stationary boss plate, the springs 25d force the movable back plate 25b into closing position to lock the sheared tubes in the chuck 25. Each chuck as it passes station 1 thus receives sheared tubes to be carried through the successive closure and sealing operations.

From station 1, the sheared tubes locked in position in the chuck 25 move to station 2, at which station the lower ends of the tubes have a layer of suitable solvent cement such as acetone applied to them. The solvent cement which is liquid is applied to the bottoms of the tubes by the mechanism shown in Figures 8 and 9. The sheared tubes 20 in chuck 25 are positioned over fingers 29a, there being one such finger 29a for each tube. The fingers 29a are spaced apart and attached, as by screws, to a cross-plate 29m. Said cross-plate 29m is attached on a rod 29b thereby forming a two fingered fork-like unit. The fingers 29a cooperate in a loose relationship with two holes formed in a cap 29n, said cap 29n sealing the upper end of the chamber 29f. A coil spring 29c is lodged in the space between the fingers 29a and abuts the inner edges of cap 29n and plate 29m as best shown in Figure 9.

The solvent cement is supplied from a container 29d, a pump 29 forcing the solvent from the container 29d through the flexible tubes 29e to the upper surface of the finger 29a where a thin layer of such solvent is deposited on the finger 29a. A tubular chamber 29f encloses the finger 29a and rod 29b and into such chamber 29f, via the holes in cap 29n, any excess solvent may run to be carried back through the flexible pipe 29g to container 29d. The fingers 29a are moved into contact with their respective desired tubes 20 by the eccentric 29h which also operates the pump 29. Motion is transmitted to the eccentric 29h through the shaft 29k. The pump 29 and associated parts as shown in Figures 8 and 9 are mounted below the chuck 25 at station 2 as more particularly shown in Figure 3.

When chuck 25 comes to rest at station 2, movement is imparted through shaft 29k to eccentric 29h so that the rod 29b moves upwardly to force the fingers 29a into contact with the bottoms of the tubes 20 thus depositing a thin layer of the solvent from the fingers 29a on the bottom of each of the tubes 20. The finger and rod unit are constantly spring-urged downwardly and tend to assume a position in relation to the movement of cam 29h.

The chuck 25 is then automatically moved to the closure station or third station. At this station, the closures or caps for the ends of the tubes are automatically formed and inserted into position while the tubes are at this station. For this purpose a roll 30 of plastic tape 31 (see Figure 4) is carried under roller 31k through heater 32 where it is preheated and then through a stamping and forming die (Figures 10–15). The preheated plastic tape 31 is fed into the stamping and forming die 33 passing through a passage 33a between upper and lower die members 33b and 33c having aligned openings 33d and 33e respectively. Each tube 20 is positioned at this station over the opening 33d in the upper die member 33b. The punch 33f, one for each tube 20, is mounted for reciprocation within the guide chamber 33g and is given reciprocation through the eccentric 33h mounted within a plate 33i on shaft 33k (see Figure 17). The plunger 33m carries the punches 33f at its upper end and is connected by arm 33n to the eccentric 33h by connecting rod 33j. The plunger 33m reciprocates in the guide chamber 33g being provided with keys 33p which move within keyways 33r formed in the walls of the guide chamber 33g. The movement of the punch 33f as shown in Figures 10 and 11 is sufficient not only to punch out the cap 33s from the tape 31 but to carry it upwardly through the opening 33d in the upper die member 33b into the bottom end of the tube 20 where it is held in position by the spring action of the plastic material of which the cap 33s is formed. The solvent present on the lower end of tube 20 acts as a lubricant and permits the cap-shaped cap to be pushed in without undue force.

Desirably the cap is given a cross-sectional contour as shown at 33s for which purpose the lower end of the opening 33d in the upper die member 33b is countersunk or cut away at 33t in order that a peripheral flange 33u may be formed on the cap 33s. Such peripheral flange 33u on the cap 33s enables the cap 33s to be placed in the end of the tube 20 and to adjust itself in position regardless of the slight variations which take place in the cross-sectional contour of the tube 20 or in the cap size itself.

Provision may be made to blow air across the die member 33b in the event that a cap 33s is not properly placed in a tube 20 or no tube 20 happens to be in the chuck. Such blast of air is delivered from pipe 33z. Each time that the punches come up and punch out a cap 33s, a blast of air under pressure is delivered across the face of die member 33b. The air delivery is controlled by cam 33v (Figure 16) which operates the spring-pressed finger 33w that presses the pipe 33z against bracket 33x to cut off air. Movement of the cam 33v removes the pressure of the finger 33w against the pipe 33z to permit air to pass through the pipe 33z. If for any reason the cap 33s does not hold within a tube 20, or if no tube 20 is in the chuck, the jet of air blows such cap down the chute 33y to a waste box.

The cap forming and closure inserting mechanism is placed at station 3 below chuck 25 (Figure 6). The tape 31 from which the caps or closures 33s have been stamped passes over roller 31a (Figure 21) and between that roller 31a and the spring pressed roller 31b cooperating therewith, the spring 31s holding the roller 31b in frictional contact with the roller 31a so that movement of the roller 31a, clockwise, draws the plastic tape 31 from the roll 30 through the die 33. The movement of the roller 31a and correspondingly of the tape 31 through the die 33 is controlled by a gear 31c (Figure 21) rigidly mounted on the shaft 31d to the roller 31a, the gear 31c being given the necessary movement by the ratchet 31e pivotally mounted on the arm 31f, the arm 31f being pivotally mounted at 31g to one end of the bell crank 31h. The movement of the roller 31a carrying the tape 31 through the die 33 is coordinated with the movement of the top plate 28 and chuck 25 carried thereon as more particularly described below.

From station 3, the tubes 20 now carrying the caps or closures 33s therein are moved to station 4 where the ends of the tubes and caps therein are wetted by a layer of solvent cement such as acetone and methyl-Cellosolve 50:50, by mechanism substantially the same as that employed at station 2 where the ends of the tubes 20 were first wetted with solvent. Such solvent cement at station 4 is applied from fingers like 29a at station 2, which fingers are also movable upwardly in the same manner as described in connection with the fingers 29a in order to exert pressure against the sealed tubes 20. The springs employed with the fingers at this station may be more powerful than those used in connection with fingers 29a at station 2 in order that sufficient pressure may be exerted to push the caps or closures 33s into exact position in line with the cut off ends of the tubes 20 so that there is no overlapping. At the same time that such action is taking place, the layer of solvent cement about .010 inch in depth on the fingers at station 4 is drawn by capillary action into the inside of the tube between the tube and the peripheral flange 33u on the caps or closures 33s. This gives a comparatively large volume of solvent on the inside of the tube with practically no solvent on the outside so that there is no marring of the external surface of the tubes 20.

Further clockwise movement of the top plate 28 brings the chuck 25 carrying tubes 20 with cemented and positioned closures 33s therein to station 5 where they are subjected to a preliminary drying operation. A blast of hot air is blown against the bottom of the tubes 20 for this purpose to remove surface solvent (Figure 7). For this purpose air is blown by fan 34a driven by motor 34b through conduit 34c where it is heated by the heater 34d and passes through the upper end of the conduit 34c about the tubes 20 to effect the preliminary drying.

From station 5 by further movement of the top plate 28, the chuck containing the capped or closure carrying tubes 20 passes to station 6 (Figure 6). At this station, the bell crank 26b has again come into contact with the boss plate 27 whereupon the chuck is opened and the capped or sealed tubes 20 drop out of the chuck into chute 35 (Figure 30) down which they are conveyed to the conveyor 36 which carries them through a heating and drying chamber 36a containing electric light bulbs 36b for heating purposes and through which hot air may be blower-circulated so that the tubes when carried out of the drying chamber 36a by the conveyor 36 are capped and sealed at one end and may be removed from the conveyor 36 for storage or packing at platform 36c. The conveyor 36 is motor driven by motor 36d (Figure 5) and belts 36e.

Considering the manner of mounting the closure applying and sealing means, and referring particularly to Figures 3, 30 and 31, a base plate 37 is mounted on frame 38. The plate 37 carries a boss 37a in which a vertical shaft 37b is mounted, the boss 37a being keyed as shown at 37c to the shaft 37b so that there is no movement between the shaft and the plate 37, the latter also being stationary. A circular plate 39 having ring gear 39a is mounted for rotation on shaft 37b for purposes hereinafter set forth. An intermediate stationary plate 40 having boss 40a is mounted on the shaft 37b above the circular plate 39, the plate 40 and boss 40a being keyed as at 40b to the shaft 37b. Plate 40 is further supported by standards 40c on base plate 37. The intermediate stationary plate 40 carries the pump and associated mechanism for applying solvent to the ends of the tubes at station 2, the cap cutting and insertion dies and punches at station 3; the solvent applicators and pressure operated fingers at station 4; the heater and blower at station 5; and the chute 35 at station 6, these various mechanisms being attached rigidly to the periphery of the stationary plate 40 at the appropriate points below the particular chucks when at the stations as indicated.

Above the intermediate stationary plate 40, a Geneva gear 41 is mounted on shaft 37b for rotation thereon, the gear 41 carrying a boss 42 to which the revolving top plate 28 also mounted for rotation on shaft 37b, is directly bolted as by bolts 42a so that the Geneva gear 41 and movable top plate 28 move together as a unit on shaft 37b. Above the boss 28b of the plate 28, the stationary boss plate 27 is mounted on the shaft 37b and keyed thereto as at 27b.

Figure 20:
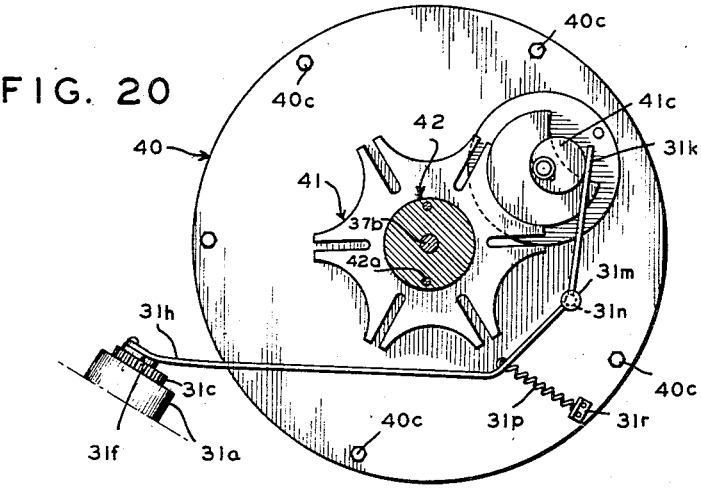
Figure 20 is a view similar to that of Figure 19 showing the parts in a different position.
Figure 21:
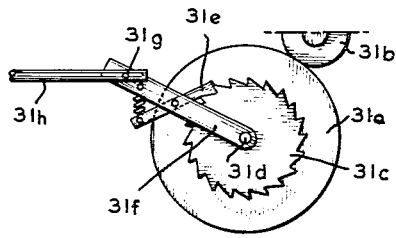

The step by step movement of the movable top plate 28 is obtained by the Geneva gear 41 (Figure 30) operated by the Geneva pinion 41a rotating on shaft 43d. The Geneva gear is provided to produce a complete revolution of plate 28 in six stepwise movements. On shaft 43d which operates the Geneva pinion, a cam 41c is mounted through which the necessary movement of the bell crank 31h is obtained to correlate the feeding of the plastic tape 31 through the die 33 with the movement of the movable top plate 28 carrying the chucks through their several stations. Thus the cam 41c transmits motion to the end 331k of the bell crank 31h (Figures 19–21) and the movement of the cam 41c will transmit the necessary motion to the bell crank 31h. Bell crank 31h is pivoted at 31m on rod 31n carried on plate 40, the end 31h of the bell crank serving by its movement to advance gear 31c and roller 31a as described (Figure 21). A spring 31p attached to the bell crank 31h and bracket 31r mounted on plate 40 holds the bell crank in spring pressed position. By this arrangement each stepwise movement of plate 28 caused by the Geneva gear 41 will produce a corresponding correlated movement of the plastic tape 31 through the die 33.

The power for operating the entire mechanism for conveying the sheared tubes 20 to the sealing station and the several operations in the sealing mechanism, is all obtained from motor 43 (Figures 2, 3, 31). Referring more particularly to Figures 2 and 31, motor 43 transmits power to the variable speed control 43a and from the latter to the speed reducer 43b from which it is transmitted to shaft 43c, the latter being coupled to the drive shaft 43d having a bevel gear 43e which meshes with bevel gear 44a on shaft 44. Sprocket 44b idles on shaft 44 until connected by clutch 44c to shaft 44. Clutch 44c is activated as follows. A plate 44g keyed to shaft 43d, carries pin 44e which revolves with the shaft 43d. Pin 44e at a portion of its revolution (Figure 32) operates to close switch 44d mounted on bracket 44f carried on base plate 37. The closing of switch 44d operates solenoid 44h which actuates armature 44i to move the clutch 44c. A spring 44k restores the clutch to inoperative position when the switch 44d is opened. The closure of switch 44d and engagement of clutch 44c permits one revolution of sprocket 44b at which time the switch is opened and the clutch disengaged. During the engagement of the clutch 44c, and revolution of sprocket 44b, the latter drives shaft 45 by means of sprocket 45a carried thereon and chain 45b cooperating with the sprockets 44b and 45a. The end of shaft 45 is provided with a miter gear 45c which meshes with ring gear 39a on circular plate 39 (see Figures 23 through 26). The ring gear 39a drives three shafts: first, shaft 29k which operates the eccentric 29h for the pump at station 2; second, shaft 33t which supplies the power to operate the punch at station 3; and third, shaft 29k which operates the eccentric 29h of the pump at station 4.

At the upper end of shaft 43d is mounted the Geneva pinion which operates the Geneva movement that gives the stepwise advancement of movable top plate 28. In this way the operations at the several stations are coordinated with the cap punching and sealing operations.

The correlation of movement of the various mechanisms will be apparent from what has been set forth above but may be briefly explained as follows. The tubes are delivered into the chucks 25 as the chucks come successively to station 1 on the revolving top plate 28. Each chuck then passes through the stations 2 to 6 successively on the revolving plate 28 where at station 2 the ends of the tubes are provided with a solvent cement, at station 3 caps or closures are punched from plastic tape and positioned in the solvent treated ends of the tubes 20 after which they pass to station 4 where the closures or caps are again subjected to treatment with solvent between the tube ends and the flanges of the caps and the caps or closures are seated in final position. From this station they then go to the preliminary drying station 5 and ultimately to station 6 where they are released from the chuck and deposited in the chute 35.

The operations through the stations are all automatically correlated each chuck receiving the tubes at station 1 in succession and following through the several stations and treatments until the finished sealed tubes are released at station 6. The application of solvent at station 2, the feeding of the plastic tape and punching of caps at station 3, the further application of solvent cement at station 4 are all correlated with the various operations by the mechanisms set forth above.

A preferred method and structure for applying solvent or cement to the thermoplastic tube is as follows. A perforated metal disc is spring mounted on a hollow pillar. This hollow pillar is firmly mounted within a metal casing in such a way that the perforated disc is flush with the top of the casing but with a clearance desirably around the periphery of approximately one thirty-second of an inch. This casing may be reciprocated by a cam motion. Suitable solvent for welding is pumped by mechanical means through the hollow shaft of the pillar, and is ejected onto the top surface of the perforated disc desirably at each stroke of the pump. A portion of this solvent may evaporate but the amount is negligible due to the small exposed surface and the short time during which the layer of solvent is exposed to the atmosphere. An excess of this solvent may be pumped at each stroke and this excess will run off through the small holes in the perforated disc, by gravity, falling into the solvent vapor filled casing. This casing is connected by a flexible pipe to the main solvent tank to permit this excess solvent to run back under gravity.

There is however a molecular attraction varying with the type of solvent which will form a meniscus curve over the whole surface of the perforated disc, in spite of the drain holes. This layer will gradually disappear due to evaporation and also due to breakdown of meniscus. The effective layer of solvent may be controlled within close limits by the number of holes in the metal disc and also by the amount of solvent that is pumped by each individual stroke of the pump onto the surface of the disc.

Both of these controls may be adjusted with ease. By the action of the cam, the perforated metal disc with its very thin layer of solvent is brought into contact with the open or sealed end of the tube for a fraction of a second and by this method it is possible to seal containers at high speed without danger of brittleness at the seal due to excessive solvent or fragility due to lack of sufficient solvent to effect a true weld.

In the particular process of manufacture of containers at high speed, as outlined in Serial No. 772,095 and set forth above, it has been found advisable to make a preliminary "dip" against the meniscus curve whereby just sufficient solvent is applied on a uniform basis day in and day out to act as a lubricant for the closure that is automatically inserted within a fraction of a second after this first dip. There is not sufficient solvent applied at this first dip to insure a good seal. If there were sufficient solvent applied to form a good weld the comparatively deep layer of solvent would automatically be applied on both the inner and outer wall of the tube and on thin tubing this would cause brittleness for reasons mentioned above.

Any possible trouble in this direction is overcome by the first very shallow dip where little solvent is used and acts as lubrication and, at the second dip we also have a very thin layer of solvent but by relying upon the capillary action of the sealing disc, sufficient solvent is attracted within the inner wall to form a 100% weld, all as explained above for Figures 1 to 32. At the moment we are using this process, turning out about one million containers a week and with no complaints due to brittleness or lack of weld on these containers.

Considering Figures 33 to 35, casing 47 is positioned below a tube 20 held vertically in a chuck 25. The upper face 47a of casing 47 has opening 47b within which disc 48 desirably of metal and perforated as shown at 48a is normally positioned and closes opening 47b substantially except for peripheral clearance at 47c. Upper face 48b of disc 48 is normally placed flush with upper face 47a of casing 47. To maintain disc 48 in normal position, it is placed on vertical pillar 47d having longitudinal channel 47e. Disc 48 is attached to collar 48c having central bore 48d which enables collar 48c and disc 48 attached thereto to reciprocate on the upper end of pillar 47d. A coil spring 47f engages against a shoulder 48g of collar 47h which is set in position on pillar 47d by screw 47k, while the other end of spring 47f engages against shoulder 48e on collar 48c. Thus disc 48 is normally held in position to close opening 47b. Casing 47 has solvent or cement inlet pipe 47l which communicates with channel 47e in pillar 47d. The pillar (and associated parts) are rigidly attached to casing 47 as at 47m.

At the upper end of pillar 47d, a series of vents 47n communicate from the channel 47e for purposes hereinafter set forth. Upper end of pillar 47d is closed by plate 47p which fits within central opening 48f of disc 48. Outlet 47q serves to permit runback of excess solvent or cement from casing 47 to the source of supply (not shown).

Boss 47r engages against cam 49 mounted on shaft 49a. Rotation of shaft 49a with cam 49b enables the casing to remain in the position shown in Figure 34 with disc 48 substantially flush with upper face 47a of casing 47. However, when cam surface 49d engages boss 47r, casing 47 and pillar 47e are elevated, and disc 48 is also elevated until disc 48 contacts the lower edge of tube 20. Immediately thereafter boss 47r rides on cam surface 49c so that pillar 47d is moved with respect to disc 48 to a position shown in Figure 35. At this time vents 47n have been raised sufficiently so that solvent or cement pumped through inlet 47l into channel 47e is expelled through vents 47n upon the upper surface of disc 48. An excess of solvent or cement is pumped at each stroke, this excess running off as pointed out above through perforations 48a in disc 48. The pumping of solvent or cement is thus coordinated with the position of the structure as shown in Figure 35.

The solvent or cement forms a shallow layer as a meniscus on the upper face of disc 48 as explained above. The depth of this layer may be readily controlled by the amount of solvent or cement pumped at each stroke and the number of perforations 48a. As soon as boss 47r rides off of cam surface 49c and returns to cam surface 49a, the structure returns to the position shown in Figure 34 and is ready for repetition of the operation.

Structures of the type shown in Figures 33–35 may be used at either of stations 2 and 4 or both in Figure 6 etc., in lieu of the structures of that figure. In this way, this modification of Figures 33–35 may be readily adapted for use in a completely automatic machine, as shown in Figures 1–32. For this purpose shaft 29k of Figure 26 will operate cam 49 which will replace eccentric 29h in Figure 26, the parts being arranged so that cam 49 engages against boss 47r as explained above.

Where structures as shown in Figures 33–35 are used at both stations 2 and 4, station 2 may be operated to give a preliminary dip, the closure inserted as at station 3, and the final solvent or cement application made at station 4 all as explained above.

The methods and structures of this invention have been extensively used in making containers free from defective closure seals, at a high speed of manufacture effectively and economically.

Having thus set forth my invention, I claim:

1. A continous method of making containers for synthetic resinous thermoplastic tubes which comprises conveying said tubes continuously through successive stations including the following successive actions: applying solvent to an open end of each tube, inserting a synthetic resinous thermoplastic closure within the solvent treated end of each tube, thereafter applying volatile solvent containing cement to each closure between the closure and the tube while positioned in each tube, and drying the cement.

2. A method of making a container from synthetic resinous thermoplastic tubes which comprises conveying said tubes continuously through successive stations including the following successive actions: applying solvent to an open end of each tube, passing a closure-forming synthetic resinous thermoplastic tape in juxtaposition to the solvent treated end of each tube, stamping a closure for the tube from said tape, inserting such closure as stamped within the solvent treated end of each tube, thereafter applying volatile solvent containing cement to each closure between the closure and the tube while positioned in each tube, and drying the cement.

3. A continuous method of making containers from synthetic resinous thermoplastic tubes which comprises conveying said tubes continuously through successive stations including the following successive operations: successively locking the tubes against longitudinal movement, applying solvent to an open end of each tube, inserting a synthetic resinous thermoplastic closure within the solvent treated end of each tube, thereafter applying volatile solvent containing cement to each closure between closure and tube while positioned in each tube, drying the cement, and releasing the locked tubes and collecting them.

4. In apparatus for making containers from tubes, in combination, means for moving synthetic resinous thermoplastic tubes successively through a series of stations maintained in successive mechanical relation including, means for assembling a group of synthetic resinous thermoplastic tubes of a length to form containers, means for delivering said group of tubes to a sealing station, means for simultaneously inserting synthetic resinous thermoplastic closures in said group of tubes, means for thereafter simultaneously applying a volatile solvent containing sealing medium between each closure and the tube carrying it, and means for simultaneously sealing said closures in said group of tubes.

5. In apparatus for making containers from tubes, in combination, means for assembling a group of synthetic resinous thermoplastic tubes of a length to form containers, means for delivering said group of tubes to a sealing station, means for passing a closure-forming synthetic resinous thermoplastic tape in juxtaposition to the open ends of said group of tubes, means for simultaneously stamping closures for said group of tubes, means for simultaneously inserting said closures as stamped in said group of tubes, means for thereafter simultaneously applying a volatile solvent containing sealing medium between each closure and the tube carrying it, and means for simultaneously sealing said closures in said group of tubes.

6. Apparatus for making a container from a synthetic resinous thermoplastic tube which comprises means for moving synthetic resinous thermoplastic tubes successively through a series of stations maintained in successive mechanical relation including means for applying a solvent for the synthetic resin to one end of each tube, means for inserting a synthetic resinous thermoplastic closure within the solvent treated end of each tube, the closure having a peripheral flange engaging against the inner walls of the tubes to hold the closures in position within the tubes, means for thereafter simultaneously applying a volatile solvent containing sealing medium between each closure and the tube carrying it, and means for sealing the closures in position.

7. In a machine for making containers from tubes, means for assembling a group of synthetic resinous thermoplastic tubes of a length to form containers, means for delivering said group of tubes to a sealing station, means for applying a solvent to one end of each tube in said group, means for inserting a synthetic resinous thermoplastic closure within the solvent treated end of each tube in said group, the closures each having a peripheral flange engaging against the inner walls of the tubes to hold the closures in position within the tubes, means for thereafter simultaneously applying a volatile solvent containing sealing medium between each closure and the tube carrying it, and means for sealing the closures in position.

8. Apparatus for making containers continuously from synthetic resinous thermoplastic tubes which comprises means for conveying said tubes continuously through successive stations including the following successive actions: means for applying solvent to an open end of each tube, means for inserting a synthetic resinous thermoplastic closure within the solvent treated end of each tube, means for thereafter applying volatile solvent containing cement to each closure between the closure and the tube while positioned in each tube, and means for drying the cement.

9. Apparatus for making containers continuously from synthetic resinous thermoplastic tubes which comprises means for conveying said tubes continuously through successive stations including the following successive actions: means for applying solvent to an open end of each tube, means for passing a closure-forming synthetic resinous thermoplastic tape in juxtaposition to an open end of each tube, means for stamping a closure for each tube from said tape, means for inserting a closure in the adjacent end of each tube, means for thereafter applying volatile solvent containing cement to each closure between the closure and the tube while positioned in each tube, and means for drying the cement.

10. Apparatus for making containers continuously from synthetic resinous thermoplastic tubes which comprises means for conveying said tubes continuously through successive stations including the following successive actions: means for locking the tubes against longitudinal movement, means for applying solvent to an open end of each tube, means for inserting a synthetic resinous thermoplastic closure within the solvent treated end of each tube, means for thereafter applying volatile solvent containing cement to each closure between the closure and the tube while positioned in each tube, means for drying the cement, and means for releasing the locked tubes and collecting them.

References Cited in the file of this patent

UNITED STATES PATENTS

| | | |
|---|---|---|
| 1,488,634 | Dunham | Apr. 1, 1934 |
| 2,186,073 | Johnson | Jan. 9, 1940 |
| 2,275,571 | Sooy et al. | Mar. 10, 1942 |
| 2,285,220 | Morrell | June 2, 1942 |
| 2,380,269 | Stuhlfauth | July 10, 1945 |
| 2,383,230 | Voke | Aug. 21, 1945 |
| 2,418,900 | Piperoux et al. | Apr. 15, 1947 |
| 2,482,636 | Peterson et al. | Sept. 20, 1949 |
| 2,549,808 | Heinle et al. | Apr. 24, 1951 |
| 2,584,095 | Slaughter | Jan. 29, 1952 |
| 2,638,718 | Rowe | May 19, 1953 |
| 2,661,790 | Slaughter | Dec. 8, 1953 |